(12) United States Patent
Barry (10) Patent No.: US 8,219,488 B2
(45) Date of Patent: Jul. 10, 2012

(54) SECURE PAYMENT SYSTEM

(76) Inventor: Gerard J. Barry, Salthill (IE)

(*) Notice: Subject to any disclaimer, the term of this patent is extended or adjusted under 35 U.S.C. 154(b) by 1016 days.

(21) Appl. No.: 10/479,030

(22) PCT Filed: Jun. 4, 2002

(86) PCT No.: PCT/IE02/00072
§ 371 (c)(1),
(2), (4) Date: Oct. 28, 2004

(87) PCT Pub. No.: WO02/097752
PCT Pub. Date: Dec. 5, 2002

(65) Prior Publication Data
US 2005/0049963 A1    Mar. 3, 2005

(30) Foreign Application Priority Data

Jun. 1, 2001  (IE) .................................. S2001/0524

(51) Int. Cl.
*G06Q 40/00* (2012.01)
*G06Q 30/00* (2012.01)
(52) U.S. Cl. ......... 705/39; 705/35; 705/26.1; 705/26.41
(58) Field of Classification Search ............. 705/35
See application file for complete search history.

(56) References Cited

U.S. PATENT DOCUMENTS

| | | | | |
|---|---|---|---|---|
| 5,826,241 | A * | 10/1998 | Stein et al. | 705/26.41 |
| 5,905,736 | A | 5/1999 | Ronen et al. | |
| 6,085,168 | A * | 7/2000 | Mori et al. | 705/17 |
| 6,188,994 | B1 | 2/2001 | Egendorf | |
| 6,246,755 | B1 * | 6/2001 | Walker et al. | 379/114.2 |
| 6,327,578 | B1 * | 12/2001 | Linehan | 705/65 |
| 6,332,133 | B1 * | 12/2001 | Takayama | 705/39 |
| 6,339,766 | B1 * | 1/2002 | Gephart | 705/44 |
| 6,970,852 | B1 * | 11/2005 | Sendo et al. | 705/67 |
| 7,006,986 | B1 * | 2/2006 | Sines et al. | 705/26.35 |
| 7,058,611 | B2 * | 6/2006 | Kranzley et al. | 705/64 |
| 7,571,139 | B1 * | 8/2009 | Giordano et al. | 705/40 |

(Continued)

FOREIGN PATENT DOCUMENTS

EP     0801479 A1    10/1997

(Continued)

OTHER PUBLICATIONS

Suzuki Takamasa, "Credit Card Account Settlement System Using Internet Line," Patent Abstracts of Japan, Sep. 11, 1998, Publication No. 10-240814, Japan.

(Continued)

*Primary Examiner* — Gregory Johnson
(74) *Attorney, Agent, or Firm* — Meschkow & Gresham, P.L.C.

(57) ABSTRACT

The present invention relates to the field of e-commerce and in particular to making purchases on-line using payment card, for example debit, charge or credit cards. The concept of the present invention adopts an alternative approach to security methods presently employed to protect cardholders. The concept obviates the need for a cardholder to transmit Card Numbers along with other purchasing details at the time of purchase and couples this with the use of a password feature. This renders the transaction akin to a Bank Cash withdrawal that Bank/card Schemes are totally happy with from a security point of view but are reluctant to allow e-commerce and/or any others access to their "network" to ensure Security.

16 Claims, 6 Drawing Sheets

U.S. PATENT DOCUMENTS

| | | | |
|---|---|---|---|
| 7,627,531 B2* | 12/2009 | Breck et al. | 705/65 |
| 7,885,899 B1* | 2/2011 | Sancho | 705/67 |
| 2001/0029485 A1* | 10/2001 | Brody et al. | 705/39 |
| 2001/0034720 A1* | 10/2001 | Armes | 705/65 |
| 2001/0034724 A1* | 10/2001 | Thieme | 705/78 |
| 2001/0044787 A1* | 11/2001 | Shwartz et al. | 705/78 |
| 2002/0013765 A1* | 1/2002 | Shwartz | 705/39 |
| 2002/0016765 A1* | 2/2002 | Sacks | 705/39 |
| 2002/0065774 A1* | 5/2002 | Young et al. | 705/41 |
| 2002/0082986 A1* | 6/2002 | Lu | 705/39 |
| 2002/0123935 A1* | 9/2002 | Asghari-Kamrani et al. | 705/26 |
| 2002/0143708 A1* | 10/2002 | Hollander et al. | 705/72 |
| 2002/0165821 A1* | 11/2002 | Tree | 705/39 |
| 2003/0018550 A1* | 1/2003 | Rotman et al. | 705/35 |
| 2003/0018567 A1* | 1/2003 | Flitcroft et al. | 705/37 |
| 2005/0049963 A1* | 3/2005 | Barry | 705/39 |

FOREIGN PATENT DOCUMENTS

| | | | |
|---|---|---|---|
| EP | 0813325 A2 | 12/1997 | |
| EP | 0848361 A1 | 6/1998 | |
| KR | 1020000012391 A | 3/2000 | |
| WO | WO 97/03410 A1 | 1/1997 | |
| WO | WO 00/14648 A1 | 3/2000 | |
| WO | WO 01/35304 A1 | 5/2001 | |

OTHER PUBLICATIONS

Okugawa Morifumi, "Card Checking Method and System," Patent Abstracts of Japan, Apr. 10, 1998, Publication No. 10-091682 with English Translation of paragraphs [0020]-[0028], Japan.

Ono Toshio, "Credit Processing System Using Telephone Terminal for Store," Patent Abstracts of Japan, Dec. 12, 1995, Publication No. 07-325862 with English Translation of paragraphs [0037]-[-0041], Japan.

Igarashi Takuya, "Device and Method for Processing Information," Patent Abstracts of Japan, May 2, 1997, Publication No. 09-114891 with English Translation of paragraphs [0069], [0092], and [0093], Japan.

* cited by examiner

| User Name | Password | CardName | CardAddress | CardScheme | Card No. | Expiry Date |
|---|---|---|---|---|---|---|
| User 1 | PW1 | CardName 1 | CardAddress | CardScheme A | CardNo. 1 | Date 1 |
| User 2 | PW2 | CardName 2 | CardAddress2 | CardScheme B | CardNo. 2 | Date 2 |
| ... | ... | ... | ... | ... | ... | ... |
| User n | PW n | CardName n | CardAddress n | CardScheme X | CardNo. n | Date n |

Purchase Order Form

| Ref: | Description | Quantity | Cost |
|---|---|---|---|
| xxxx | Goods or services | 1 | £100 |

43a — Ref
43b — Description
43c — Quantity
43d — Cost

NAME: ___________ (44a)
Address: ___________ (44b)
Phone No.: ___________ (44c)

Payment Method
● ISP secure card payment
○ Normal card payment

45

[ Confirm ]  [ Reject ]
   41          42

SECURE PAYMENT SYSTEM

FIELD OF THE INVENTION

The present invention relates to the field of e-commerce and in particular to making purchases on-line using payment cards, for example debit, charge or credit cards.

BACKGROUND TO THE INVENTION

Significant research and resources have been applied in developing, implementing and maintaining secure payment systems which facilitate the use of credit/charge cards by cardholders in commercial transactions conducted over the Internet.

All of these secure systems are based on cardholders having to "process" their card number each time, which leaves the "capturing" of card numbers and related information transmitted at time of purchase, open to hackers and/or other fraudsters who can gain access to card numbers and expiry dates.

One solution is to use secure (encrypted) methods of communication in sending credit card details over the Internet to a merchant when making a purchase. Examples of such secure methods include Secure Socket Layer (SSL) and the Secure Electronic (SET) protocol. These methods have been developed by leading computer companies and businesses in the credit card industry specifically for the purposes of performing electronic transmission of credit card details on the Internet. However, there is no guarantee that the credit/charge card details whilst transmitted somewhat securely are not vulnerable to attack when stored on the merchant's system. It is a strong possibility that the card details could be hacked or used by a merchant or an employee of the merchant for fraudulent purposes.

A further concern mitigating against on-line commerce, as perceived by cardholders, is the reliability of the e-commerce merchants and the lack of recourse available to card holders having made a purchase. The cardholder has no guarantee that items ordered will be delivered in a timely manner and be of an appropriate quality and/or quantity etc. It may be difficult, once card details have been supplied and appropriate funds debited to the cardholder's account, for a cardholder to obtain proper satisfaction from the merchant.

A further concern is that there is no guarantee that a merchant, or associated personnel who may have access to the cardholders details, will not use the cardholders card details in subsequent unauthorised transactions, or pass the information onto third parties for criminal purposes.

On the other hand, a significant concern for merchants is that items are definitely settled for before dispatch, i.e. that the card details and amount has been "approved" for settlement by the card scheme acquirer and that the card details and cardholder information is genuine.

EP 0801479 discloses a secure communication mechanism for communicating credit card or other sensitive information between a cardholder terminal and a server which communicate over a data network (e.g. Internet). For secure or private communication of sensitive information over a data network, a telephone connection is established between the originating Internet Service Provider (ISP) server to which the cardholder is connected for access to the data network and the server provider to which the sensitive information is directed. Any communications or transactions to a terminating ISP server involving credit card or other sensitive information are effected, however, on a second connection through a telephone call placed to a telephone number of the terminating ISP server. After receiving a call, and by associating such call with the cardholder's request over the Internet for information and/or interactive services, and/or non-electronically deliverable goods or services, the ISP provides the cardholder with the requested information and/or service, or approves delivery of the non-electronically deliverable goods or services. With this arrangement, payment is effected without providing credit card information via the Internet routing servers and without establishing a financial relationship with the ISP. Preferably, the communication of information over the telephone line between the originating server and the terminating ISP server is also subject to encryption. The problem with this approach is that is essential for ISPs and merchants to sign up to the idea and to the installation of additional communications equipment to facilitate the secure communication on the secondary channel. Furthermore, the requirement for a separate telephone call adds additional cost to the process and there is still no guarantee from the cardholder's perspective.

WO97/03410 discloses an Internet billing method comprising establishing an agreement between an Internet access provider and a customer, and an agreement between the Internet access provider and a vendor, wherein the Internet access provider agrees with the customer and the vendor to bill the customer and remit to the vendor for products and services purchased over the Internet by the customer from the vendor. The provider creates access to the Internet for the customer. When the customer orders a product or service over the Internet from a vendor, transactional information transmitted between the customer and the vendor is also transmitted to the provider. The provider then bills the transaction amount to the customer and remits a portion of the transaction amount to the vendor, keeping the differential as a fee for providing the service. As a result of this method, there is no need for any customer account numbers or vendor account numbers to be transmitted over the Internet, thereby maintaining the security of that information. An immense difficulty with this approach is that agreements are required between the ISP's and merchants before any transactions can take place.

U.S. Pat. No. 5,905,736 discloses a method for performing centralised billing for transactions conducted over the Internet between a cardholder and an Internet Service Provider through an Internet Access Provider (IAP). Upon connection of the cardholder's terminal to the LAP, the IAP transmits to a billing platform a message that associates the cardholder's identity and the temporary Internet Protocol (EP) address -that is assigned by the IAP to the cardholder's session for use by to that cardholder's terminal. In response to a chargeable transaction with an ISP, the ISP transmits to the billing platform the IP address of the cardholder making the transaction and the charge for the transaction. The charges for all such transactions are accumulated by a transaction server and stored in an account on an associated database identified with the IP address of the requesting terminal. At the end of the cardholder's session, the charges for all the transactions during the session that are stored on the transaction server database in the account identified with the IP address, are charged to an account associated with the cardholder's identity that is stored on a database of a billing server by cross-referencing the IP address to the cardholder's identity from the previously received and stored message.

In consideration of the prior art, it would be advantageous if a method of purchasing goods on-line could be provided which would permit a cardholder to have a simple and efficient recourse to the e-commerce merchant in the event of a complaint.

It would further be desirable, if a method could be provided, which would allow a consumer to make a purchase on-line without disclosing their card details to third parties.

SUMMARY OF THE INVENTION

The concept of the present invention adopts an alternative approach to security methods presently employed to protect cardholders. The concept obviates the need for a cardholder to transmit card numbers along with other purchasing details at the time of purchase and couples this with the use of a password feature. This renders the transaction akin to a bank cash withdrawal that banks/card schemes are totally happy with from a security point of view but are reluctant to allow e-commerce and/or any others access to their "network" to ensure Security.

In a first embodiment, a computer data processing method is provided for processing an on-line payment transaction, comprising the steps of:

receiving a request from a cardholder to connect to a network, said request including a cardholder password, authenticating said cardholder request and providing access by said cardholder to the network, receiving a payment request associated with the cardholder, said payment request identifying merchant information including a merchant code identifier and a transaction value, retrieving payment card details for the cardholder from a cardholder details database, submitting a payment authorisation request for the payment card details, the authorisation request including the merchant code and transaction value to an authorisation host for authorising the transaction, and whereupon receipt of an authorisation forwarding confirmation of the authorisation to the merchant.

The computer data processing method may further comprise the step of requesting a merchant code identifier from the merchant. The computer data processing method may include the step of posting the payment request to a payment host for processing of the payment transaction. Where posting is performed, the computer data processing method may further comprise the step of delaying posting the payment request until a confirmation of delivery has been received. Optionally, the computer data processing method may further comprise the step of verifying to ensure that the cardholder information provided to a merchant matches cardholder information stored in the cardholder's details database.

In a second embodiment, a computer data processing method is provided for processing an on-line payment transaction, comprising the steps of:

receiving a request from a cardholder to connect a network, said request including a cardholder password, authenticating said cardholder request and providing access by said cardholder to the network, receiving a first transaction request associated with a transaction between a merchant and the cardholder, retrieving payment card details for the cardholder from a database, submitting a payment authorisation request for the payment card details, the authorisation request including a system merchant code and transaction value to an authorisation host for authorising the transaction, and on receipt of an authorisation forwarding a transation request to the merchant, the request including a cardholder payment card code.

The computer data processing method may further comprise the step of requesting a merchant code identifier from the merchant. The computer data processing method may include the step of posting the payment request to a payment host for processing of the payment transaction. Where posting is performed, the computer data processing method may further comprise the step of delaying posting the payment request until a confirmation of delivery has been received. Optionally, the computer data processing method may further comprise the step of verifying to ensure that the cardholder information provided to a merchant matches cardholder information stored in the cardholder's details database.

In a third embodiment, a system is provided for processing an on-line payment transaction, the system having a connection to the Internet and a further connection via a local network to the terminal of a cardholder comprising:

receiving means for receiving a request from a cardholder to connect a network, said request including a cardholder password, authentication means for authenticating said cardholder request and providing access by said cardholder to the network, receiving means for receiving a first transaction request associated with a transaction between a merchant and the cardholder, retrieval means for retrieving payment card details for the cardholder from a database, authorising means for submitting a payment authorisation request for the payment card details, the authorisation request including a system merchant code and transaction value to an authorisation host for authorising the transaction, and transaction means responsive to receipt of an authorisation from the authorisation host and adapted to forward a transaction request to the merchant, the request including a system cardholder account code.

In this embodiment, the system may further comprise a merchant request means for requesting a merchant code identifier from the merchant. The system may include a payment posting means for posting the payment request to a payment host for processing of the payment transaction. In this option, the payment posting means delays posting the payment request until a confirmation of delivery has been received.

Optionally, the system may include a verification means which is adapted to perform a second verification to ensure that the cardholder information provided to a merchant matches cardholder information stored in the database.

In a fourth embodiment a payment processing system is provided for processing an on-line payment transaction between a merchant and a cardholder, comprising:

means for receiving a payment transaction request, said payment request identifying merchant information including a merchant code identifier and a transaction value, association means for associating a cardholder with the received payment request, means for retrieving payment card details for the cardholder from a datastore of cardholder card details, authorisation means for submitting a payment authorisation request for the retrieved payment card details, the payment authorisation request including the retrieved payment card details, the merchant code of the payment request and the transaction value of the payment request to an authorisation host for authorising the transaction, confirmation means which is adapted to forward confirmation of an authorisation received in response to a submitted payment authorisation request.

In this embodiment, the system may further comprise a merchant request means for requesting a merchant code identifier from the merchant. The system may include a payment posting means for posting the payment request to a payment host for processing of the payment transaction. In this option, the payment posting means delays posting the payment request until a confirmation of delivery has been received.

Optionally, the system may include a verification means which is adapted to perform a second verification to ensure that the cardholder information provided to a merchant matches cardholder information stored in the database.

In a fifth embodiment a payment processing system is provided for processing an on-line payment transaction between a merchant and a cardholder, comprising:

means for receiving a payment transaction request, said payment request identifying merchant information including a merchant code identifier and a transaction value, association means for associating a cardholder with the received payment request, means for retrieving payment card details for the cardholder from a datastore of cardholder card details, authorisation means for submitting a payment authorisation request for the retrieved payment card details, the payment authorisation request including the retrieved payment card details, a system merchant code and the transaction value of the payment request to an authorisation host for authorising the transaction, response means responsive to receipt of an authorisation and adapted to forward a transaction request to the merchant, the request including a system cardholder account code.

In this embodiment, the system may further comprise a merchant request means for requesting a merchant code identifier from the merchant The system may include a payment posting means for posting the payment request to a payment host for processing of the payment transaction. In this option, the payment posting means delays posting the payment request until a confirmation of delivery has been received.

Optionally, the system may include a verification means which is adapted to perform a second verification to ensure that the cardholder information provided to a merchant matches cardholder information stored in the database.

In one embodiment, the first set of information identifying a cardholder and the second set of information identifying the merchant are received using an Internet submission protocol, for example the POST action associated with HTNL forms.

These and other aspects of the invention will be apparent from, and elucidated with, reference to the embodiment(s) described hereinafter.

BRIEF DESCRIPTION OF THE DRAWINGS

The invention will now be described in greater detail with reference to the accompanying drawings in which.

DETAILED DESCRIPTION OF THE DRAWINGS

Figure 1:
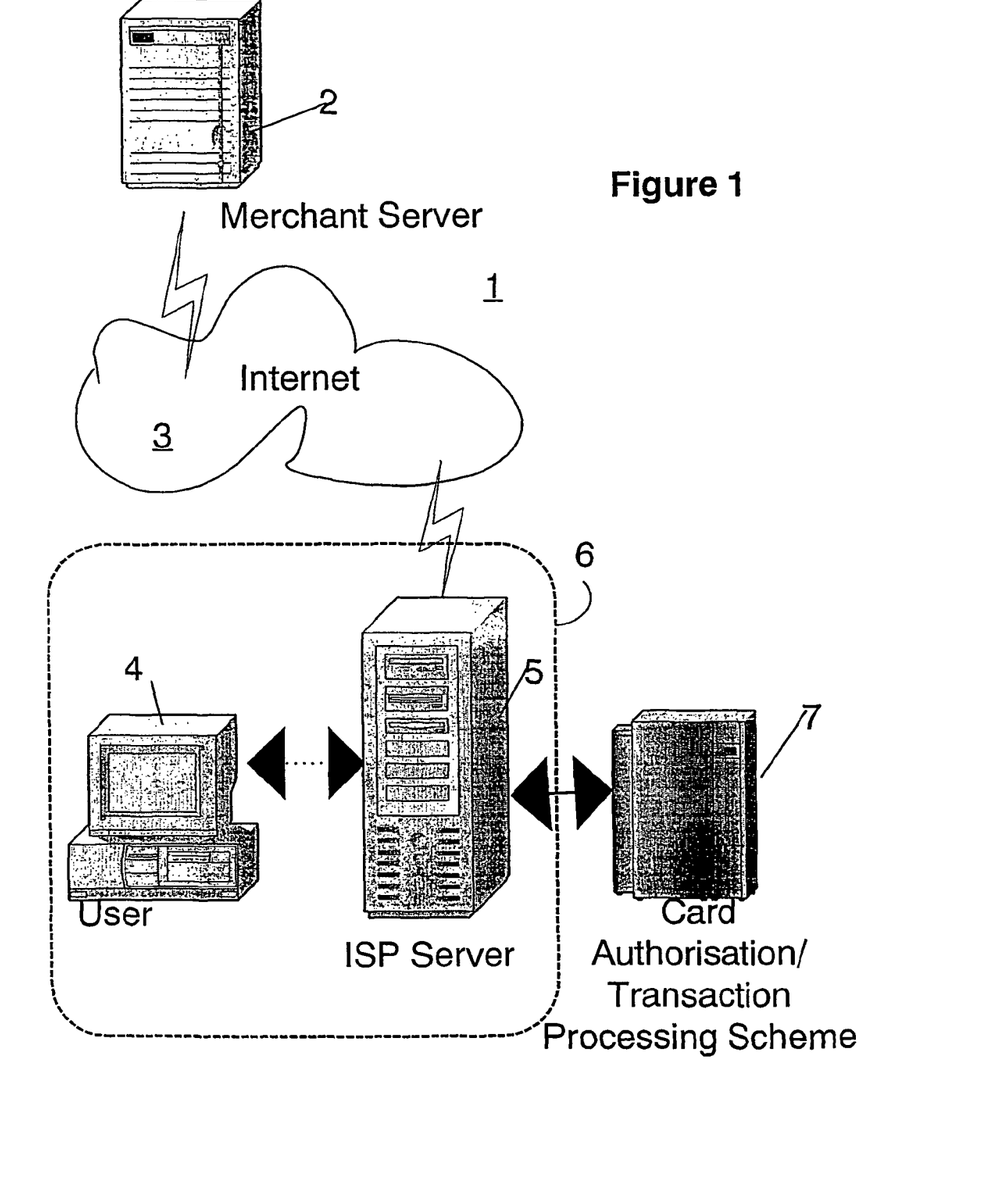
FIG. 1 is a pictorial representation of the arrangement of a payment transaction scheme according to the invention.

An arrangement of the on-line transaction scheme according to the invention, shown in FIG. 1, involves a number of different parties at different nodes in a network. In particular, the process is concerned with an on-line (e-commerce) transaction conducted between a payment card (typically a debit, credit or charge card) cardholder 4 and a merchant 2.

Communication between the merchant and cardholder is conducted over a network 3 (the Internet). The merchant, or more precisely the merchant's server 2, is, conventionally, continuously connected to the network so as to allow consumers unhindered access to the merchant's web site.

The cardholder's computer may on the other hand be configured to connect to the Internet 3 only as required. Typically, the cardholder's computer connects to the Internet 3 via an Internet Service Provider (ISP) 5. The connection to the ISP may be made using a modem over a conventional or ISDN telephone line or by other suitable communication means.

Upon connecting to the ISP 5, the cardholder may be required to enter a cardholder name and/or cardholder password. An authentication means, for example a security software module, performs a verification process typically comparing the cardholder name and password entered against a cardholder security database of valid cardholder names and passwords stored locally on the ISP server or an associated server or network of the ISP's server. Upon verification of the cardholder name and password, the cardholder's computer is granted access through the ISP network to the Internet.

Typically, the ISP servers 5 may be connected to the Internet 3 using routers and other associated hardware devices. Security and protection for the ISP server and associated local network may be provided by firewall devices or software. This combination of router technology and security features allows ISP's to make services available on the ISP servers which may be accessed directly by cardholders connecting through the ISP without the necessity for transmission of cardholder requests and server responses over the Internet. In this way, communications between a server on the ISP network and a cardholder's computer connecting to the Internet through the ISP Network are not generally interceptable by third parties on the Internet.

Figure 2:
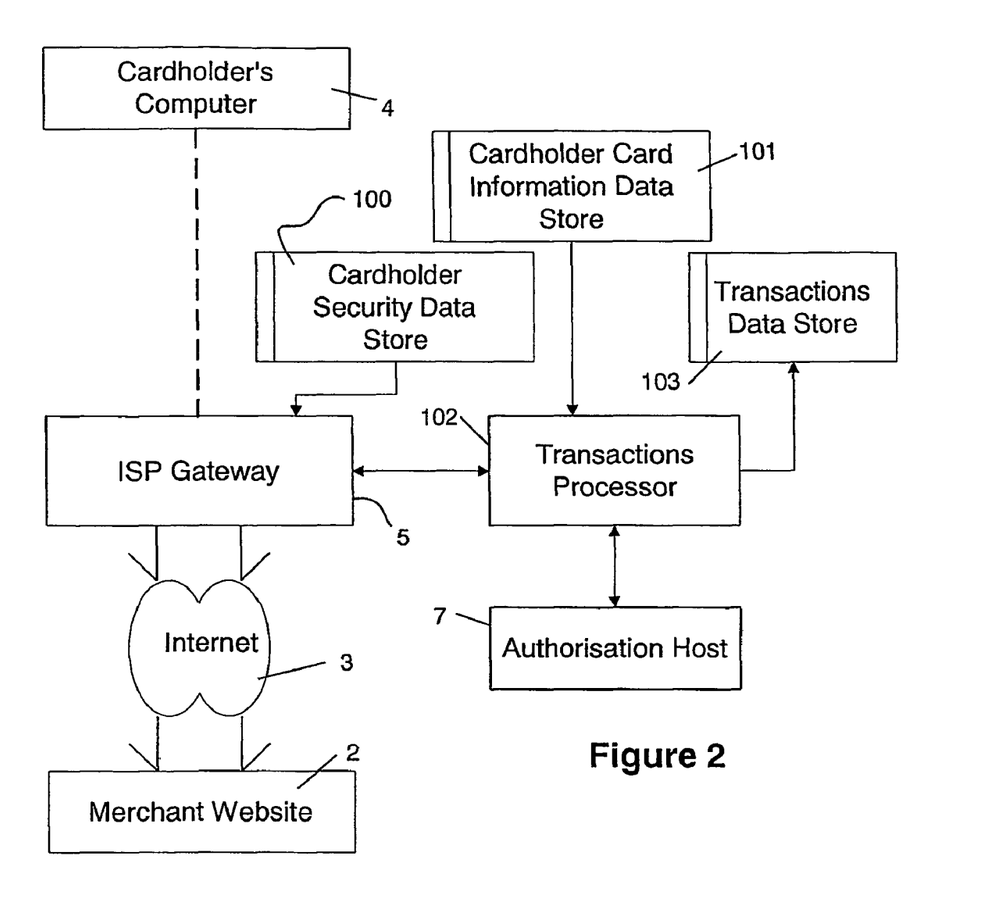
FIG. 2 is a more detailed representation of the arrangement of FIG. 1.

An exemplary structure for an ISP system for providing a cardholder access to the Internet and an associated payment/validation processing system for processing an on-line transaction between the cardholder and a merchant according to an embodiment of the invention is illustrated in FIG. 2. The associated payment processing system may be integrated within the ISP or maintained in a separate system in association with the ISP. In this exemplary structure, the cardholder database 100, 101 of the ISP described above is expanded to include further cardholder information, as illustrated in the exemplary database structure of FIG. 3, which may include the names 12, addresses 13 and payment card details of cardholders 14, 15, 16. The payment card key details may typically include details of the card payment scheme 14 (e.g. VISA™, AMERICAN EXPRESS™, DINERS CLUB™, MASTER CARD™etc.), card number 15 and expiry date 16 of the individual cardholders.

Figure 3:
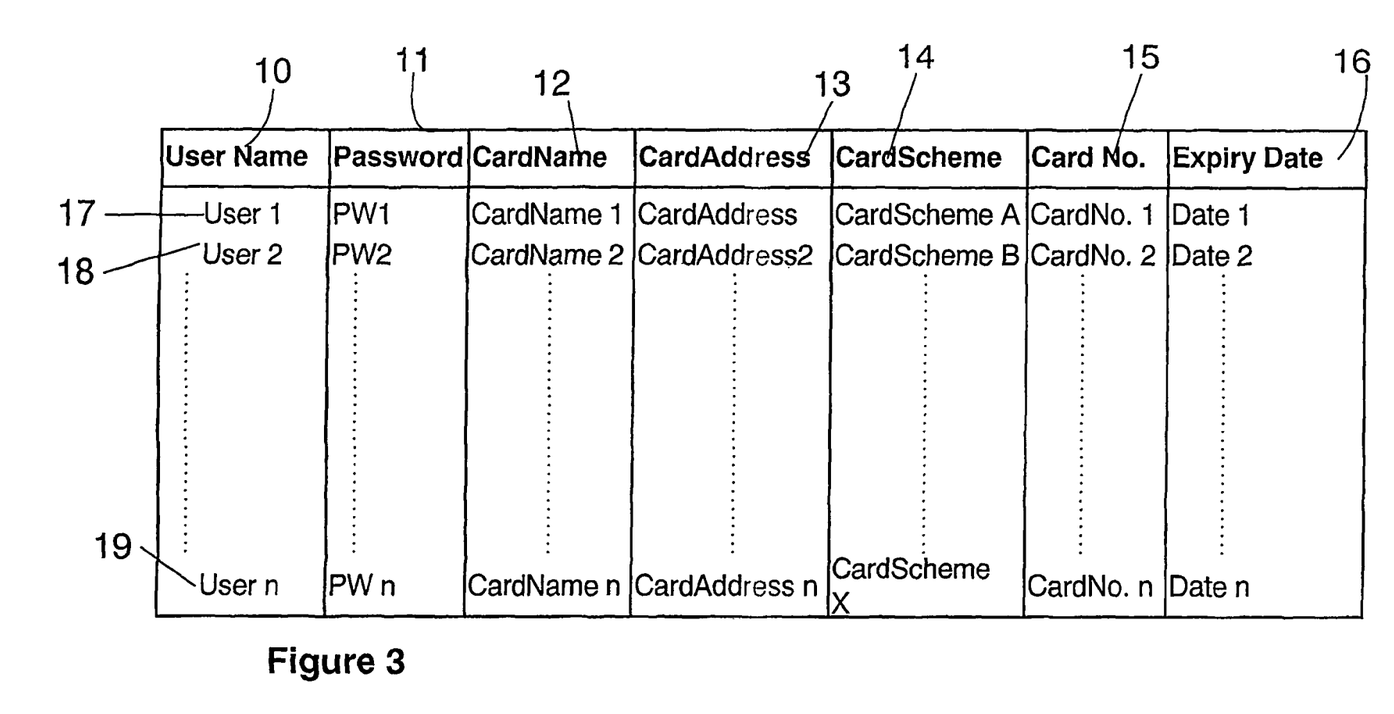
FIG. 3 is a schema of an exemplary database for use with the present invention.

These key payment card details could be established when the cardholder establishes their account with the ISP or at some subsequent time convenient to the cardholder and ISP. For reasons of security, it is proposed that the key details be supplied in a written application from the cardholder to the ISP. Alternatively, these key details may be provided by a telephone call to the ISP. Use of either of these methods would ensure that a cardholder's key details are not transmitted over the Internet. A less preferred embodiment, would allow a cardholder to enter their key details on-line.

It will be appreciated that the database structure may be implemented using one or more tables 100, 101 in a relational database. Each cardholder account may have more than one associated set of key card details, i.e. where a cardholder has more than one credit card. In this scenario, it will be appreciated by those skilled in the art that a multiple table database would be appropriate having a first table identifying cardholders and their passwords, with a second table used to hold cardholder details. An additional field could be used to link the tables, e.g. a cardholder number which is created at the time of entry of the cardholder to the database and is unique to each cardholder. It will be appreciated further that the cardholder card details 101 may be stored in a separate system altogether to the cardholder security data store 100, in particular where the transaction processing system is distinct from the ISP.

Generally, the methods of the invention commence with a cardholder establishing 20 a connection to the Internet via an ISP including the conventional steps of cardholder verification (authentication) 21. At the time of connection, the ISP may associate the connection ID (e.g. the assigned IP number) of the cardholder's computer with the cardholder. This may be used subsequently by the ISP to identify the cardholder in a transaction.

Once a cardholder has established 22 a connection to the Internet through the ISP, the cardholder may use appropriate browser software e.g. NETSCAPE NAVIGATOR or MICROSOFT INTERNET EXPLORER to navigate the Internet and browse merchants' web sites.

Figure 4:
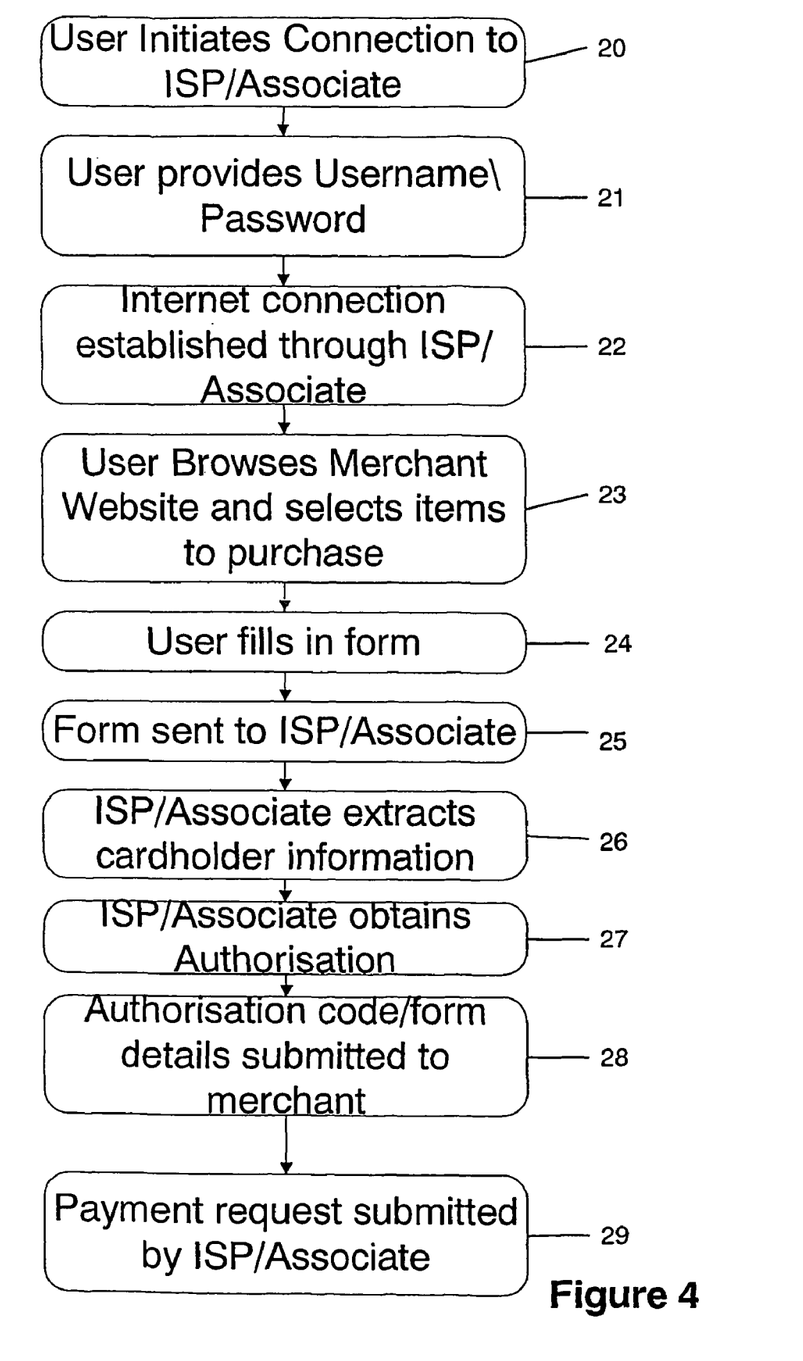
FIG. 4 is a flowchart of a method according to a first aspect of the invention.

A first method of operation of the invention is shown in FIG. 4. In this embodiment, the merchant has established an agreement directly or indirectly with the ISP, which in the context of the present invention should be taken to mean an ISP with an associated payment processor, to use the transaction scheme of the present invention. It commences with a cardholder accessing a merchant's website. The cardholder may, depending on the configuration of the merchant's website, view descriptions of goods or services for sale, view pictures of these goods or services, and select items to purchase 23. Techniques for implementing these facilities on a website server are well known in the art.

Upon receipt of a request to purchase an item from the cardholder, the merchant server may respond by forwarding a form for completion by the cardholder. The form may be a Hyper Text Mark-Up Language (HTML) document, with a small JAVASCRIPT program included to ensure that required fields are completed properly, although any browser readable form may be used.

HTML forms which are well known in the art and permit the inclusion of a number of fields which indicate to the browser software what action to take with the form, how and where to send the information provided by a cardholder in a form.

Figure 5:
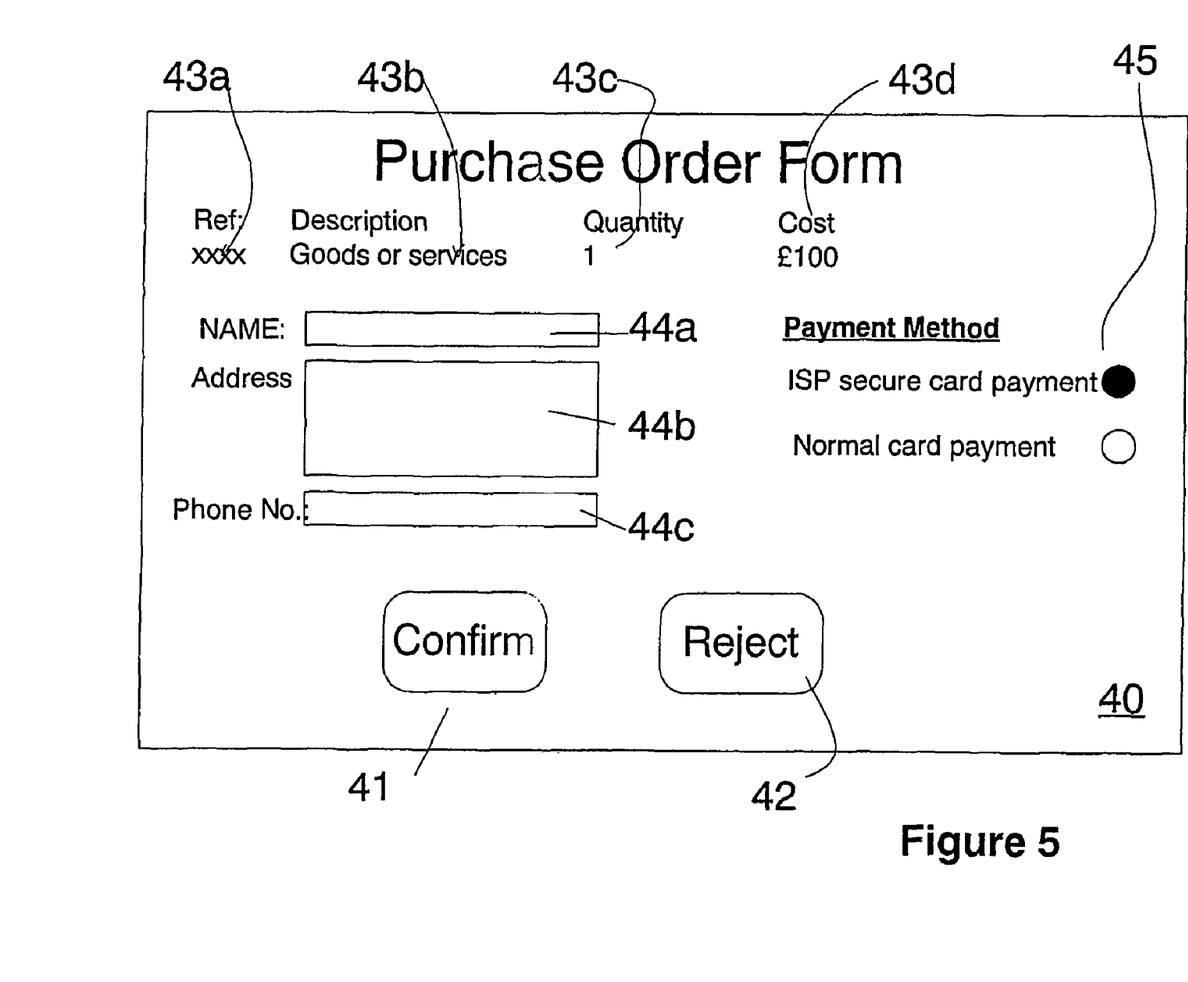
FIG. 5 is a representation of a form intended for use with the invention.

An example form 40 is shown in FIG. 4. The form allows the cardholder to enter some information, e.g. their name 44*a*, address 44*b* and phone number 44*c*, using their browser software.

The form 40 may also contain information detailing the transaction including for example a description of the goods 43*b*, the quantities 43*c*, prices 43*d* and a merchant transaction reference number 43*a*. All of this information may be stored as fields in the form. Certain fields may be marked as hidden, e.g. the merchant transaction reference number.

Once the cardholder has filled in the form 24 and clicked on an appropriate button 41 the form 40 is submitted by the browser software to a location defined in the form itself. A suitable script embedded in the HTML document may check the validity of fields and values entered. For example, a script might prompt the cardholder to re-enter their details if the name field had been left blank.

The method of the invention may be configured to operate in a variety of different ways. In a first embodiment, in which the merchant's system is adapted to co-operate with the transaction system of the ISP, the merchant system provides the merchant's merchant code for a card scheme to the ISP.

This may be implemented by the merchant providing a purchase payment option 45 corresponding to the ISP service. For example, the cardholder may be able to select the payment scheme of the ISP or an associate from a drop down list in a form, or using a check box.

In one embodiment in which the cardholder selects the payment method prior to completing the above described form, upon selection of the option that the cardholder wishes to make a purchase using the cardholder's credit card details which are stored on their ISP or an associate, the form described above is forwarded to the cardholder by the merchant for completion. The form contains fields, which may be hidden, identifying merchant card information, e.g. the merchant's merchant code, an identifier of the card scheme.

Upon completion of the form by the cardholder, the form is submitted 25 to the ISP server or an associated server hosting the transaction processor 102. The transaction processor 102, which includes a receiving means for receiving the form, extracts 26 information from the form including the the merchant's merchant code and the amount of the transaction.

The transaction processor includes an association means which determines from which cardholder the form has been submitted, for example using the IP address of the computer from which the request was sent and associates the transaction with that cardholder.

Once the transaction processor has determined the identity of the cardholder, the transaction processor using suitable retrieval means, retrieves 26 cardholder card details for the associated cardholder from the cardholder card information database. The transaction processor 102 (or an associated authorisation device) then establishes (if not already established) a connection to a card scheme authorisation host 7 and submits 27 the payment card details, the merchant code and the transaction value for approval. The connection to the authorisation host may for example be made over a dedicated security network or a telephone line.

If the authorisation host rejects the transaction, the transaction processor responds by sending a suitable message to the cardholder and/or merchant and the transaction is cancelled.

If the transaction is approved, the authorisation host provides the transaction processor 102 with a transaction authorisation number as per conventional payment transaction. The transaction processor using a confirmation means then forwards 28 confirmation of the authorisation, for example by insertion of the authorisation code as a field with the form details already completed by the cardholder, to the merchant server.

The details of the transaction including the merchant information, cardholder information and transaction details may be stored by the transaction processor or in a transactions datastore either locally or on an associated server for subsequent processing 29 (e.g. by a posting means of the transaction processor posting the transaction information to a card payment scheme for processing of the transaction). Although, this step may be completed simultaneously with authorisation.

Upon receipt of a confirmation, e.g. an authorisation code, with the transaction details, the merchant has an effective guarantee that the transaction will be valid and that the merchant will receive settlement in due course from the card scheme. With this guarantee, the merchant can allow the transaction, for example, the supplying the goods or services requested to proceed.

It will be appreciated that in the entire transaction, the cardholder's card key details have never been revealed to the merchant.

In a further embodiment, the transaction processor stores the details of the transaction but holds the transactions for posting until confirmation of processing of an order by a merchant or receipt of goods by a cardholder. For example, the transaction processor may hold the transaction until receipt of a message from the merchant detailing a delivery service company and their delivery transaction record. Upon receipt and possibly verification of such information, the transaction processor would release the transaction for processing by the appropriate card scheme.

It will be apparent to those skilled in the art that a number of different methods and techniques may be used to allow the cardholder submit the information and for the transaction processor to obtain the merchant's card scheme details. For example, the merchant or the merchant's server software may simply identify the domain of the ISP gateway from the header information provided by the cardholder's browser software when connecting to the merchant. The merchant or the merchant's server software may forward a transaction request to a pre-designated sub-domain (previously indicated by the ISP to the merchant) or a pre-defined standard domain. For example, if the header information received from the cardholder indicated that it was sent from the domain TESTISP.COM, then the merchant software may select the standard sub domain of PAYMENT.TESTISP.COM to send the request to.

Figure 6:
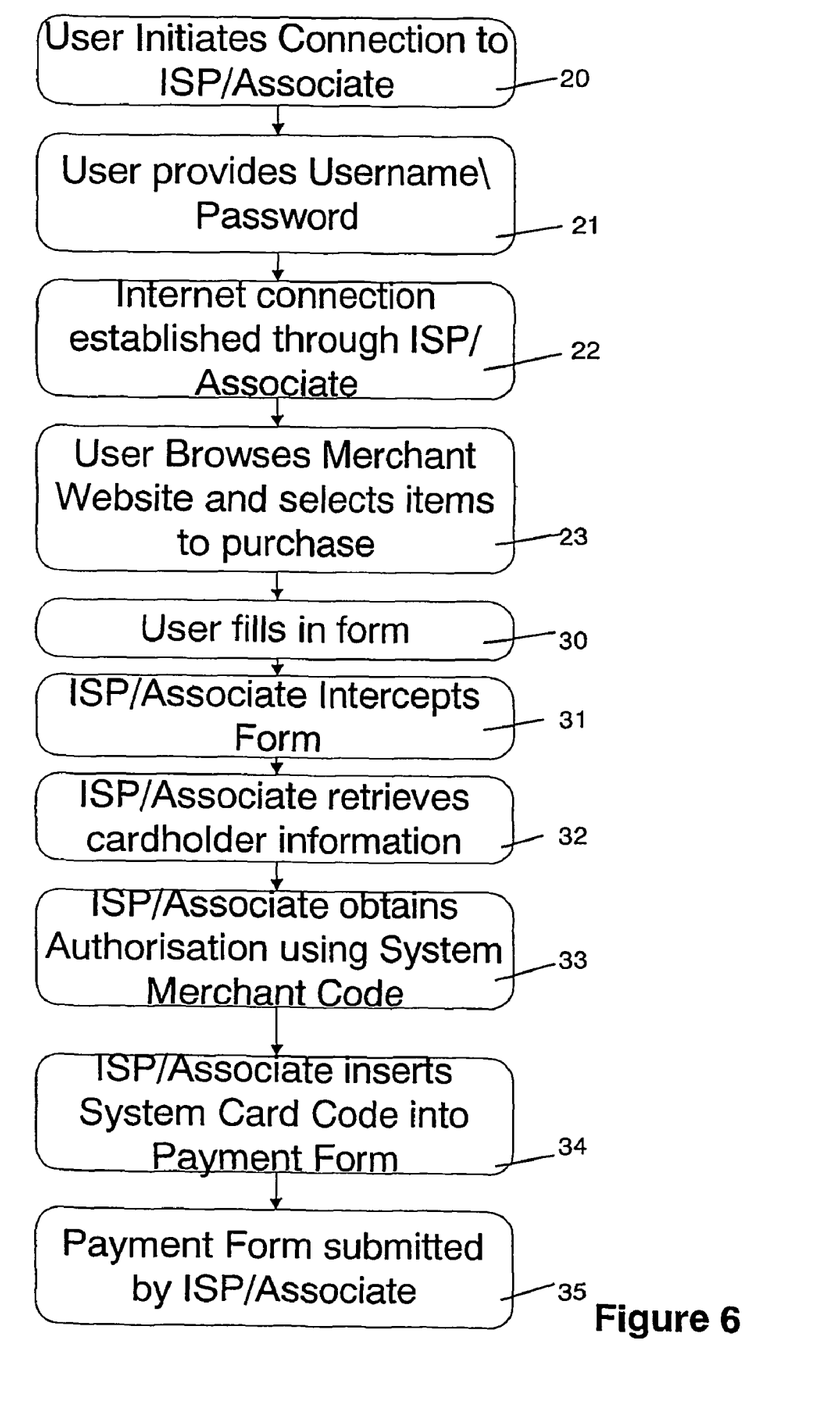
FIG. 6 is a flowchart of a method according to a second aspect of the invention.

In a second embodiment, the merchant may not have an agreement with the ISP or an associated transaction processor to facilitate use of the method described above. In this second embodiment, the transaction processor intercepts 31 the transaction form which has been completed 30 by the cardholder. This interception may for example be effected by the cardholder clicking a button on their graphical interface, the selection of which effects the running of a software module which directs the completed form to the ISP transaction processor.

Upon receipt of the form, the transaction processor 102 may initially check to determine whether the merchant is approved for use with the ISP or associated transaction system either directly or via another party. The approval may also be in a negatively expressed way, in which merchants are banned from using the system, e.g. where the merchant has previously not performed satisfactorily in delivering goods or services. In this way, a reliability factor can be included when cardholders are dealing with merchants. A merchant could be placed on a banned list following a successful complaint by a cardholder.

The transaction processor may also, using a merchant request means, attempt to submit a message to the merchant asking the merchant to provide their merchant details to allow processing of the transaction to proceed. For example, the message may be submitted by entering the message in fields of the transaction form and submitting these details to the merchant's server. This is particularly suited to situations where the transaction processing on the merchant's website is manually performed, i.e. in situations where a person manually re-keys submitted card information via a Point of Sale (POS) or virtual POS payment card device. In situations, where the payment transaction part of a website is automated, it is possible that the merchant's server would generate an error message.

In the event that the merchant responds to such a request and provides their merchant card scheme details, the transaction may be processed as described above with respect to the processing of the transaction request in the first embodiment.

In the event that a merchant responds negatively or fails to respond within a period of time, the method proceeds along the following lines:

As described above with respect to the first embodiment, the transaction processor determines the identity of the cardholder and extracts 32 the cardholder information for the cardholder from the cardholder card key details datastore.

Optionally, the transaction processor may include a verification means adapted to perform a check to ensure that the name and/or address etc. on the database matches that supplied by the cardholder in the transaction form.

In this second embodiment, the transaction processor does not posess the merchant's merchant code information. As a result, it may not be possible to directly process the transaction as in the case of the first embodiment described.

To overcome this, the payment processor employs a merchant code of its own, i.e. a merchant code associated with the transaction processor operator (e.g. the ISP), hereinafter refered to as the system_merchant code. The transaction processor then transmits 33 a payment authorisation request to an appropriate authorisation host, submitting the system_ merchant code, the amount of the transaction (extracted from the form) and the cardholder's payment card details (card number and expiry date).

If the authorisation host rejects the transaction, then a suitable message is sent to the cardholder and the transaction is cancelled as described previously.

If the authorisation host approves the transaction, it forwards an authorisation code to the transaction processor 102.

Upon receipt of the authorisation code, the transaction processor stores it along with the other details of the transactions in the transactions datastore for further processing (e.g. payment) 35.

It will be appreciated that once this transaction is processed for settlement with the card scheme, the amount of the transaction will be debited from the cardholder and credited to the system_merchant (transaction processor scheme operator) account corresponding to the system_merchant code. This first transaction does not involve the merchant, only the transaction processor scheme operator and the cardholder.

In order to pass settlement (from the transaction processor scheme operator) to the merchant, the transaction processor provides cardholder information, card number and expiry date corresponding to an account of the transaction processor operator, hereinafter referred to as the system_cardholder account, to the merchant. The merchant may process this system_cardholder information in the conventional way. In this second transaction, the transaction processor scheme operator system_cardholder account is debited and the merchant's account is credited. In combination with the first transaction, an effective debit is made from the cardholder's account and the merchant is credited for the transaction amount. The transaction processor segments of the two transactions effectively cancel.

One method in which the transaction processor may provide its system_cardholder information to the merchant is by insertion 34 of the relevant system_cardholder card information in the appropriate fields of the form previously completed by the cardholder and submitted to the transaction processor and forwarding this revised form to the merchant's server.

Upon receipt of the form, the merchant's server processes the form in a conventional manner. In this instance, however, the merchant's server submits a authorisation and (subsequent) payment request for the system_cardholder card number and not the cardholder's card number details.

The transaction processor in turn forwards confirmation of acceptance of the transaction to the merchant along with the authorisation code. The merchant is not forwarded the payment card details of the cardholder.

The transaction processor stores the details of the transaction subsequently posting the transaction (e.g. in a day end posting) for payment in accordance with conventional methods. Alternatively, the transaction could be posted at the time of authorisation.

In this second embodiment, there are two transactions of equal value. The first transaction is between the transaction processor scheme operator and the cardholder. The second transaction is between the transaction processor scheme operator and the merchant. To prevent fraud, the transaction processor may be suitably adapted to perform reconciliations between the two sets of transactions, identifying transactions that are unusual.

In a further embodiment, cardholders may have more than one card belonging to one or more card schemes. In this embodiment, the details of each individual card may be stored in the database. At the time of entering the cardholder name and password when connecting to the ISP or at some other appropriate time, the cardholder may be asked to identify which card they wish to use for that session.

Alternatively, the cardholder may identify a particular card for a transaction at the time of submitting the form, e.g. be selection of an appropriate button. To ensure greater security, each card may be assigned a reference identifier by the cardholder at the time of submitting details to the ISP. For example, a cardholder may assign a name "VISA—household" to a VISA™ credit card used primarily for purchasing for the household or "AMEX—business" to identify an AMERICAN EXPRESS™ card used for business purposes. By providing the cardholder with a list of card identifiers to select from, the cardholder can identify the card they wish to use without the necessity for the cardholder or transaction processor to transmit data disclosing the card details to the cardholder.

Frequently, a cardholder will have more than one address associated with one or more cards. For example, a cardholder may have a business address for a card associated with work and a home address for other cards. In addition, cardholder's frequently may wish to have goods delivered to an address, which is not the cardholder's actual address, e.g. a present to a loved one.

In a further embodiment of the present system, the cardholder card key details database is structured so as to allow more than one address to be associated with a particular card or cardholder account. These addresses could be entered at the same time as a cardholder provides card details to the ISP or may be amended at a subsequent date to remove or add for addresses.

At the time of conducting a validation check, the transaction processor could check to confirm that the address provided by the cardholder at the time of the transaction matched an address on the database for the particular card or cardholder.

Although the present invention has been described in terms of HTML forms, it will be appreciated by the skilled person in the art that a variety of different methods could be used to implement the present invention that would not depart from the spirit or scope of the invention. For example, cardholders could download a specific add-in for their browsers that automatically operate upon detection of a selection by a cardholder or response from a merchant server, e.g. where the merchant server responds with a particular file format upon receipt of a purchase request from the cardholder.

As herein described the present invention directed towards the routing of a payment transaction through an ISP and access only being permitted by a cardholder using a password, it includes the possibility of correlation/verification that cardholders database name/address etc. agrees with transaction order's name/address and permits the obtaining of payment authorisation independent, but on behalf, of a merchant. If declined, the declination is passed on to the cardholder and the transaction is not processed. If approved, then a confirmation is sent to the cardholder and the merchant.

As a further separate confidence building measure, settlement of the transaction vis a vis the merchant can be delayed until independent confirmation of dispatch has been received.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. A computer data processing method for processing a payment transaction between a debit, credit or charge card cardholder and a merchant, comprising the steps of:
   receiving a request from the cardholder to connect to a network, said request including a cardholder password,
   authenticating said cardholder request and providing access by said cardholder to the network,
   receiving a payment request associated with the transaction between the cardholder and the merchant at a transaction processor, said payment request identifying merchant information and a transaction value,
   retrieving, at the transaction processor, payment card details for the cardholder from a cardholder details database,
   submitting a payment authorization request from the transaction processor to an authorization host for authorizing a first transaction to debit the transaction value from the cardholder payment card and credit the transaction value to a system merchant account associated with the transaction processor, the authorization request including a system merchant code associated with said transaction processor, the transaction value, and the retrieved payment card details, wherein the system merchant code identifies the transaction processor for payment of said on-line payment transaction, and
   forwarding information from the transaction processor to the merchant upon receipt of an authorization or to the cardholder upon receipt of a refusal of an authorization.

2. The computer data processing method according to claim 1, further comprising the step of posting to a payment host a request to process the first transaction to debit the transaction value from the cardholder payment card and credit the value to the system merchant account associated with the transaction processor upon receipt of said authorization.

3. The computer data processing method according to claim 2, further comprising the step of delaying posting the request to process the first transaction until a confirmation of delivery has been received.

4. The computer processing method according to claim 2 wherein:
   the forwarding activity includes forwarding, to the merchant, system cardholder information associated with a system cardholder account and the transaction value, wherein the system cardholder account is associated with the transaction processor, and the method further comprises engaging in a second transaction to debit the transaction value from the system cardholder account and credit the transaction value to a merchant account associated with the merchant in order to complete the payment transaction.

5. The computer processing method according to claim 1, wherein the information forwarded to the merchant by the transaction processor includes system cardholder information corresponding to a system cardholder account for the transaction processor and the transaction value.

6. A payment processing system for processing a payment transaction between a merchant and a cardholder connected to one another by means of respective networked computers, comprising:

a transaction processor for performing operations comprising:

receiving a payment request associated with the transaction, said payment request identifying merchant information and a transaction value, retrieving payment card details for the cardholder from a database of cardholder details, submitting a payment authorization request to an authorization host for authorizing a first transaction to debit the transaction value from the cardholder payment card and credit the transaction value to a system merchant account associated with the transaction processor, the payment authorization request including the retrieved payment card details, a system merchant code associated with the transaction processor, and the transaction value, wherein the system merchant code identifies the transaction processor for payment of the payment transaction, and forwarding information to the merchant in response to an authorization or to the cardholder upon receipt of a refusal of an authorization.

7. The system of claim 6, wherein the information forwarded to the merchant by the transaction processor includes system cardholder information corresponding to a system cardholder account for the transaction processor and the transaction value.

8. The system of claim 6, wherein the transaction processor is configured to perform a further upon receipt of the authorization, the further activity comprising:

posting, to a payment host, a request to process the first transaction to debit the transaction value from the cardholder payment card and credit the transaction value to the system merchant account associated with the transaction processor.

9. The system of claim 8, wherein the information forwarded to the merchant comprises system cardholder information associated with a system cardholder account and the transaction value; and wherein the system is configured to perform the further activity of:

engaging in a second transaction to debit the transaction value from the system cardholder account and credit the transaction value to a merchant account associated with the merchant in order to complete the payment transaction.

10. The computer data processing method for processing a payment transaction between a debit, credit or charge card cardholder and a merchant comprising:

receiving, at a transaction processor, a purchase request associated with said payment transaction between said cardholder and said merchant, said purchase request identifying merchant information for said merchant and a transaction value;

retrieving, at said transaction processor, cardholder payment card details from a cardholder details database;

submitting a payment authorization request for said retrieved payment card details from said transaction processor to an authorization host for authorizing a first transaction to debit the transaction value from the cardholder payment card associated with said cardholder and credit the transaction value to a system merchant account associated with the transaction processor, said payment authorization request including said transaction value, a system merchant code associated with said transaction processor, and said cardholder payment card details;

upon receipt of an authorization at said transaction processor from said authorization host, posting a request to process said first transaction to debit said transaction value from said cardholder payment card associated with said cardholder and credit said transaction value to the system merchant account associated with said transaction processor; and engaging in a second transaction to debit said transaction value from a system cardholder account associated with said transaction processor and credit said transaction value to a merchant account associated with said merchant in order to complete said payment transaction between said cardholder and said merchant without provision of details of said cardholder payment card to said merchant.

11. The method as claimed in claim 10 further comprising preventing each of said engaging activities upon receipt of a refusal of said authorization.

12. The method as claimed in claim 10 wherein in response to posting a request to process said first transaction, said method further comprises:

providing, from said transaction processor to said merchant, system cardholder information associated with said system cardholder account for authorization of said second transaction; and posting a request to process said second transaction upon receipt of an authorization of said second transaction at said merchant from an authorization host.

13. The method as claimed in claim 12 wherein said purchase request includes cardholder information associated with said cardholder, and said providing operation comprises:

modifying, at said transaction processor, said purchase request associated with said payment transaction to replace said cardholder information with said system cardholder information; and forwarding said modified purchase request with said system cardholder information to said merchant.

14. The method as claimed in claim 12 wherein in response to said providing activity, said method further comprises prior to engaging in said second transaction, submitting a payment authorization request from said merchant to an authorization host for authorizing said second transaction, said payment authorization request including said transaction value, a merchant identifier associated with said merchant, and said system cardholder information associated with said transaction processor.

15. The method as claimed in claim 10 further comprising:

receiving, at said transaction processor, a cardholder password from said cardholder; and authenticating said cardholder password to enable said cardholder to participate in commerce with said merchant.

16. The method as claimed in claim 10 wherein said purchase request includes cardholder information associated with said cardholder, said cardholder information excluding details of said cardholder payment card associated with said cardholder, and said method further comprises:

retrieving, at said transaction processor, said cardholder information from said cardholder details database;

verifying that said cardholder information included in said purchase request matches said cardholder information retrieved from said database prior to said engaging activities; and preventing said first and second transactions when said cardholder information included in said purchase request fails to match said cardholder information retrieved from said database.

\* \* \* \* \*

UNITED STATES PATENT AND TRADEMARK OFFICE
CERTIFICATE OF CORRECTION

| | | |
|---|---|---|
| PATENT NO. | : 8,219,488 B2 | Page 1 of 1 |
| APPLICATION NO. | : 10/479030 | |
| DATED | : July 10, 2012 | |
| INVENTOR(S) | : Gerard J. Barry | |

It is certified that error appears in the above-identified patent and that said Letters Patent is hereby corrected as shown below:

In Column 12, Line 48, Claim 1, Line 25 of the Claim, DELETE the words "on-line".

Signed and Sealed this
Fourth Day of December, 2012

David J. Kappos
*Director of the United States Patent and Trademark Office*